April 15, 1930.  J. A. WALLER  1,754,378
SAW FILING DEVICE
Filed Sept. 13, 1928   3 Sheets-Sheet 3

INVENTOR.
John A. Waller,
BY Arthur P. Knight and
Alfred W. Knight
ATTORNEYS

Patented Apr. 15, 1930

1,754,378

UNITED STATES PATENT OFFICE

JOHN A. WALLER, OF LOS ANGELES, CALIFORNIA, ASSIGNOR TO WALLER MANUFACTURING CORPORATION, LTD., OF LOS ANGELES, CALIFORNIA, A CORPORATION OF NEVADA

SAW-FILING DEVICE

Application filed September 13, 1928. Serial No. 305,641.

This invention relates to improvements in a saw filing device and the main object of the invention is to provide a means for this purpose which will be convenient, rapid and accurate in operation.

This application is a continuation in part of my application for patent on saw filing device, Serial #264,905, filed March 26, 1928.

Particular objects of the invention are to provide a saw filing device having advantageous means for automatically shifting the file from one tooth to the next so as to successively file all of the similarly disposed teeth of a saw; to permit adjustment of the file to varied horizontal angular positions with respect to the blade of the saw and also to different vertical angular positions for filing teeth of different inclinations; to provide simple means for insertion and removal of different sized files and for holding such files firmly in any position of adjustment; to provide means for easy and rapid reversal of the relative positions of parts of the mechanism, so as to adapt the device to filing either of the series of alternate, reversely directed teeth of a saw; to provide for adjustment of the device to saws having varying numbers of teeth to the inch, as well as to saws in which the teeth are not spaced exactly a certain number to the inch; and to provide inaccuracies in the previous filing of a saw from effecting the accuracy of the filing action of this device. Other objects will be apparent hereinafter.

The device comprises in general a supporting and positioning yoke adapted to be mounted adjacent the toothed edge of a vertically disposed saw blade and having means adapted to engage teeth of the saw and means adapted to embrace the blade thereof, a file-carrying frame slidably mounted on said yoke and adjustable to slide in different horizontal angular directions thereon, handle means at one end of said frame provided with means for clamping one end of a file in any desired vertical angular position, additional clamping means for the other end of the file adjacent the other end of the file-carrying frame, whereby a file may be clamped in position in the frame and the entire frame forcibly moved backward and forward on said yoke to cause said file to engage and file a tooth of the saw, and means operable by a simple continuation or prolongation of one of the strokes in the filing operation to automatically shift the file to the next (or any other) succeeding similarly disposed tooth, said file-shifting means being reversible so as to cause shifting of the file in one direction or the other, depending upon the direction in which it is desired to shift the same in filing any particular series of teeth.

The accompanying drawings illustrate embodiments of my invention and referring thereto.

My invention comprises a file-carrying frame consisting of two parallel rods 1 connected at one end by a head 2 upon which is mounted the handle 3 having means for clamping one end of a file in position in said head, and clamping means 4 adjustably mounted on said rods adjacent the other end thereof for supporting the other end of the file. The head 2 may comprise two parallel plates 6 connected at the top by web 7, said plates and web being advantageously formed as an integral piece and being secured in position on the ends of rods 1 in any suitable manner as by means of nuts 8.

Figures 7, 8, 9, 10, 11, 12, 13, 14:
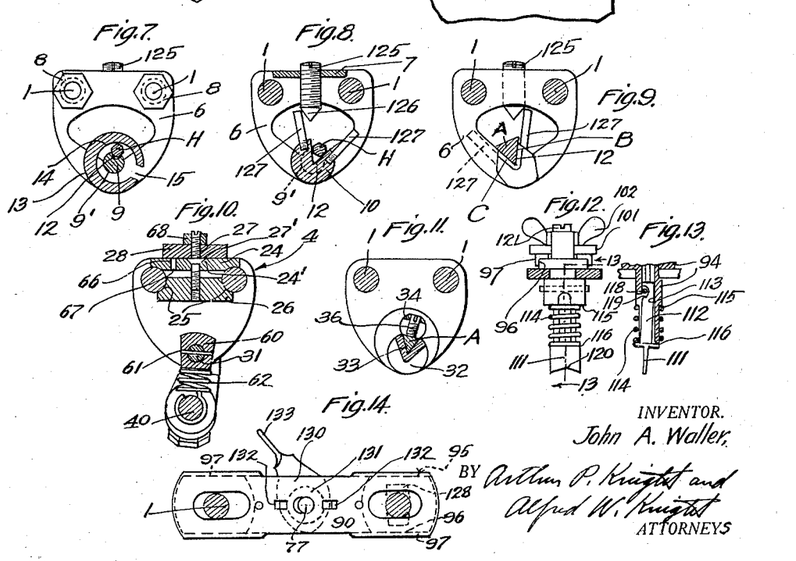
Fig. 12 is a section on line 12—12 in Fig. 5.
Fig. 13 is a section on line 13—13 in Fig. 12, with the tooth-engaging member in tilted position.
Fig. 14 is a horizontal section on line 14—14 in Fig. 5.

The clamping means for the head end of the file may comprise a stem or shank 9 rotatably mounted in recesses 9′ in the lower portion of the plates 6 and having a flange 10 engaging between said plates and a shoulder 11 engaging the inner face of the innermost one of said plates so as to hold said shank against endwise movement with respect to the head 2. Said shank is provided in its upper face with a tapered V-shaped groove or notch 12 adapted to receive the head end of the file, shown at H, said groove extending to the center of shank 9 at the end of said shank as shown at 12' so as to bring the lower edge of the file in line with said center. A collar 13, rotatably mounted on said shank beyond the outer plate 6, is provided with an eccentric or cam-faced recess 14 adapted to engage the head of the file as shown in Fig. 7 when said collar is turned to a certain position and hold the file in said groove, said collar being also provided, however, with a slot 15 which extends throughout the length of the inserted head of the file and which may be turned to position directly above the head portion of the file so as to permit removal of the same.

The main portion of handle 3 may comprise a follower member or sleeve 16 slidably mounted on shank 9 but keyed thereto by means of pin 17 passing through a somewhat elongated opening 18 in said shank. The outer end of shank 9 is threaded as indicated at 19 and a rounded clamping member 20 is threaded thereon as a nut, so that by tightening the member 20 the collar 13 and sleeve 16 are clamped between said clamping member and the outer head plate 6, thus holding said collar in position to retain the file in groove 5 and also preventing turning of the handle, together with shank 9, in the head 2.

Figure 4:
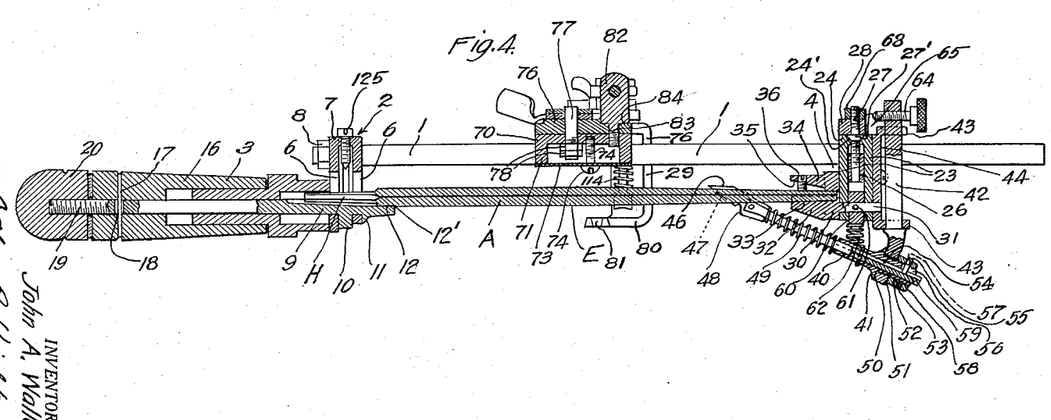
Fig. 4 is a longitudinal vertical section.

The supporting device 4 for the other end of the file may comprise a frame consisting of two plates 23 connected together at their upper ends by cross piece or web 24 and each provided with circular openings 25 through which said rods pass. Said plates and crosspiece are also preferably formed as an integral piece. A clamping member 26 may be provided between the plates 23 and between and beneath the rods 1, and a clamping screw 27 extends through a disc-shaped member 28 whose function is described hereinafter, and through the cross-piece 24, and screws into the clamping member 26, said screw being provided with a tapered shoulder 27' engaging in a countersunk recess 24' in the web 24, so that by tightening said screw the rods 1 will be clamped between said clamping member and the upper faces of openings 25 in plate 23, thus securing the file holding device 32 in any desired position on rods 1. A file holding member 30 is pivotally mounted at the lower portion of plates 23 as by means of pivot pin 31 secured thereto and extending horizontally through said plates. The axis of pivot 31 is aligned with that of shank 9, so that both ends of the file turn about a common axis in the adjustment thereof to different vertical angular positions. Said file holding member is provided with a lower portion 32 having a V-shaped notch or recess 33 adapted to receive the end of an ordinary three cornered or tri-angular file and an upper portion 34 having its lower face 35 inclined upwardly and outwardly as shown in Fig. 4 so as to permit files of different sizes to fit in the notch 33 and against said face 35. A small set screw 36 may also be provided in the member 34 for clamping this end of the file in position in notch 33. The bottom of recess 33 is preferably so disposed as to bring the lower edge of the file, indicated at E, substantially in line with the axes of shank 9 and pivot 31.

The file indicated at A is thus held and supported at both ends and may be turned to different angular positions about a longitudinal axis, the limits of such angular movement being preferably a position in which one of the faces B of the file is in vertical or substantially vertical position and a position in which the other face C is in vertical or substantially vertical position. Such turning of the file may be effected by loosening the clamping member 20 on the handle and then turning the member 16 and shank 9 to bring the file to the desired position, the file holding member 30 swinging about its pivot 31 in this movement. Clamping member 20 may then be tightened to hold the file in this position.

Means may also be provided for limiting the angle to which the file may be turned. The means for this purpose may comprise a screw 125 threadedly mounted in the web portion 7 of head 2 and having its lower end tapered downwardly and inwardly as shown at 126, and two pins 127 projecting radially from flange 10 of the file clamping means and extending substantially parallel to the two lower or operative faces of the three cornered file. By screwing the adjusting screw 125 in or out, the angle through which the file may be turned in either direction before one of the pins 127 engages the tapered portion of said screw to prevent further movement may be adjusted as desired. It is also evident that with said adjusting screw in any definite position, the file is permitted to be turned to the same angular position in either direction. With the adjusting screw removed sufficiently to permit the pins 127 to be moved into line with the lower point thereof, the file is permitted to be moved to either of the above mentioned limiting positions in which one or the other of the faces B or C is substantially vertical.

Lifting means for automatically lifting the file by engagement with the teeth of the saw so as to permit shifting thereof as hereinafter described, are also mounted upon the file supporting device 4. Said lifting means may comprise a lifting member or rod 40 slidably mounted in a guide sleeve 41 mounted upon the lower end of swivel rod 42 which is pivotally mounted in lugs 43 of bracket or plate 44 secured in any suitable manner to the outer plate 23, as by means of screws 45. The rod 40 is inclined upwardly and inwardly toward the file and is provided at its upper end with a tooth-engaging spur or prong 46 having an inclined lower face 47 adapted to engage and ride in a depression between adjacent teeth of the saw and a shoulder 48 adapted to engage the face of the saw as hereinafter described. The guide sleeve 41 is shown as provided with a shoulder 50 abutting against the inner face of an inclined boss 51 at the lower end of swivel rod 42, and with a threaded stem portion 52 extending through said boss. A nut 53 is screwed on the end of said threaded portion and up against the outer face of the boss to secure the sleeve thereto. Rod 40 is provided with a longitudinal guide groove or keyway 54, and a guide member or key 55 engages in said keyway and in a groove 56 in the threaded stem 52 and a notch 57 in nut 53. A second nut 58 screwed on threaded stem 52 holds said key in place. Said key serves to permit sliding movement of rod 40, but prevents turning thereof and holds the spur or prong 46 in substantially vertical position. A compression spring 49 is placed around the rod 40 and between the spur 46 and guide member 41 so as to tend to hold said rod and spur upwardly in the position shown, for example, in Figs. 2 and 4, a stop pin 59 being provided at the lower end of rod 40 and adapted to engage the end of threaded stem 52 to limit such upward movement.

The rod 40 and spur 46 may be swung about the axis of swivel rod 42 to a position at either side of the file, depending upon the direction in which the file is to be advanced along the saw. In order to permit such movement of the lifting means past the file it is only necessary to press the spur 46 downwardly sufficient to clear said file, whereupon the same may be shifted to the other side of the file and again released.

Means are provided tending to hold the lifting means consisting of rod 40 and spur 46 out away from the file, such means comprising for example a hub member 60 secured to pivot 31 as by means of pin 61 and a resilient member such as a small coiled spring 62 secured at one end to guide sleeve 41 and at the other end of hub 60. It is apparent from Fig. 10 that shifting of the file supporting member 30 to either side will swing the hub 60 in the same direction and cause an outward force to be exerted through spring 62 upon the guide sleeve 41, tending to throw said guide sleeve and rod 40 outwardly in the same direction. Such movement of the lifting means away from the file may be limited by means of a stop screw 64 threadedly mounted in the upper end of pivot 42 and and adapted to engage either face of a V-shaped recess 65 in the member 28 aforesaid.

By screwing the stop screw 64 in or out, the amount of outward movement of the lifting means away from the file may be regulated, by varying the angle through which the swivel member 42 is permitted to turn before said stop screw engages the face of recess 65. Member 28 may be provided with a pin 66 engaging in an opening 67 in web 24, to keep the same from turning, and may further be held in position by means of nut 68 screwing on the upper end of screw 27.

A supporting and guiding means is also provided, on which the longitudinal frame rods 1 are slidably mounted, said supporting means including a guide plate 70 having vertical flange portions 71 at each end, provided with bearing or guiding recesses 72 fitting the upper faces of rods 1. A resilient metal plate 73 extends beneath said rods and is secured at its center to the plate 70 as by means of screw 74. Said resilient plate engages the lower faces of rods 1 and is preferably bent upwardly at its outer edges, as indicated at 75, around said rods. Said resilient plate tends to hold the rods upwardly into the recesses 72, but is adapted to yield somewhat to permit slight tilting of the frame on the supporting means under certain conditions as hereinafter described.

A saw-engaging supporting yoke 76 is pivotally mounted on the guide plate 70, by means of vertical pivot 77 disposed mid-way between the rods 1, so that said yoke may be swung in either direction about a vertical axis passing through the longitudinal center line of the apparatus and hence through the lower edge of the file. The pivot 77 may be formed integrally with or secured rigidly to the yoke 76, and may extend, as shown, through an opening in plate 70 and be held in position thereon by means of lock nuts 78 which are loose enough to permit free movement of yoke 76 relative to plate 70. The yoke 76 is provided at its ends with downwardly extending arms 79 each provided with inwardly turned horizontal portions 80 at their lower ends. The lower portions of arms 79 and the horizontal portions 80 are slotted as at 81 so as to embrace the blade of the saw and maintain the file in definite angular position with respect to said blade. Said yoke 76 may be secured in any position of angular adjustment relative to guide plate 70, about the aforesaid vertical axis, by means of a thumb-screw or other clamping screw 82 which passes through an arc-shaped slot 83 in yoke 76, and threadedly engages the plate 70, said screw having a shoulder 84 engaging the upper face of yoke 76 to clamp said yoke in position. The outer face of yoke 76 may be provided with scale mark 85 cooperating with a center mark 85' on plate 70 to indicate relative angular position of said members, the marks 85 being numbered or designated in any suitable manner if desired, so as to permit the yoke 76 to be quickly set and clamped in position for filing teeth whose faces are at different horizontal angles from the plane of the saw blade.

An adjustable stop member 86 may be provided in the upper portion of each of the slots 81, said stop member being vertically adjustable, as by means of screw 87 passing through a slot 88 therein and threaded into the arm 79, whereby the same may be adjusted to and clamped in any desired vertical position so as to limit the depth to which the file is permitted to go below the plane of the points of the teeth.

A shifting bridge member 90 is slidably mounted on yoke 76, said bridge having an elongated slot 91 fitting over the upper end of pivot member 77. Each end of yoke 76 is provided with an elongated slot 93 through which extends a standard 94 provided with tooth-engaging means hereinafter described whereby the file may be properly spaced and held in position for filing. Each of the standards 94 may be provided with a flange 95 projecting beyond the sides of slot 93 and engaging the upper face of yoke 76. Said flanges may be flattened at their sides as indicated at 96 and the bridge member 90 may be provided with downwardly turned edge portions 97 engaging said flattened sides whereby said bridge member is guided to move in a direction longitudinally of yoke 76 and also the standards 94 are held from turning with respect to said yoke and said bridge.

The bridge 90 is also provided with elongated slots 100 through which extend the upper ends of standards 94. A positioning disc 101 is freely mounted around each of said standards above the bridge 90, and the upper end of each standard is threaded and a thumb nut 102 is provided thereon. Tightening of said thumb nut serves to clamp together all of the parts 95, 90 and 101, while loosening of said thumb nut permits said parts to be adjusted as hereinafter described. Each of the discs 101 is adapted to engage inwardly against an upwardly projecting pin 103 on bridge 90, so as to determine the spacing of each of the standards 94 from the center of said bridge, and means are provided whereby turning of said discs to different position permits said discs and the standards 94 to be moved inwardly to different distances so as to accommodate the device to saws whose teeth are not spaced exactly so many to the inch. For this purpose a portion of the periphery of each of said discs may be flattened as shown at 104. The pins 101 may be provided with marks 105 and scale means or lines 106 may also be provided on the upper face of the discs 101 adjacent the flattened face 104. The arrangement is preferably such that when the discs 101 are turned so that a portion of the circular periphery thereof contacts the respective pins 103, the respective standards 94 are spaced exactly one inch from the center of bridge 90, while by turning said discs so as to bring different scale marks 106 on the flattened face 104 into line with the marks 105 and moving the discs inwardly in this new position to contact said pins, said distance may be adjusted to suit saws having different spacings of teeth. The several scale marks 106 may, of course, be numbered or designated in any suitable way to indicate the various spacings corresponding thereto.

One or both of the discs 101 may also be provided with means permitting the same to be moved inwardly toward the center of bridge 90 through a distance corresponding to the length of one tooth of the saw, so as to bring the corresponding tooth-engaging member one tooth nearer to the file. For this purpose said discs may be provided with a series of notches 108 distributed about the periphery thereof, said notches being of sufficient width to receive the pin 103 and being of varying depths corresponding to the various lengths of teeth commonly provided in various types of saws. Said notches may also be numbered or designated so as to indicate the tooth spacing to which they correspond.

Each of the standards 94 carries tooth-engaging means consisting, for example, of a knife edge member 111 adapted to engage and rest on the top of the saw between the teeth thereof. Each knife edge member is preferably provided with a V-shaped notch 120 at its lower end for centering said members on the saw blade. Each of said knife edge members may have a shank portion 112 mounted to slide vertically in a recess 113 in the lower portion of standard 94, and a small coiled spring 114 is provided between a shoulder 115 on said standard and a shoulder 116 on the knife edge member so as to tend to hold the supporting means and the file carrying frame upwardly from the saw. Relative turning and sliding movement of shank 112 in recess 113 is limited by means of a small pin 118 extending through a recess 119 in said shank and secured to the standard 94. Additional adjustable means may also be provided for limiting relative downward movement of the supporting means and file-carrying frame, such means consisting for example of an adjusting screw 121 threadedly mounted in a recess 121' in the upper portion of each of the standards 94 and adapted to engage an upward extension 122 of shank 112. Each of the standards 94 is also provided with flange or shoulder means 128 engaging the under face of yoke 76 and cooperating with flange 95 to prevent relative vertical movement of said standard with respect to said yoke. There are preferably two shoulders 128, diametrically opposite one another and projecting beyond the sides of slot 93, so that upon removal of bridge 90 the standard may be turned 90° to bring said shoulders in line with said slot, thus permitting removal of standard 94 from yoke 76.

Means are also preferably provided for permitting slight inward yielding of each of the tooth-engaging knife edges 111 toward and from the file, while preventing outward yielding thereof. For this purpose each standard 94 may be slotted or cut away at its inner face as indicated at 123 so as to permit the shank portion 112 thereof to tilt inwardly through said cut away portion as indicated at 112′ in Fig. 13.

In order to compensate for the thickness of the tooth-engaging members 111 and bring the lower edge of the file always in proper relation to the tooth to be filed, means are provided for shifting the bridge 90 longitudinally of yoke 76 and thus shifting the position of pins 103 and consequently the position of the standards 94 carrying said tooth-engaging members. Such shifting means may comprise a cam member 130 pivoted on a boss 131 on yoke 76 and adapted to engage one or the other of two downward projections 132 on bridge 90, upon movement of said cam member in one direction or the other so as to shift said bridge in that direction. Said cam member may be provided with a handle portion or arm 133 for manual operation thereof.

Figure 2:
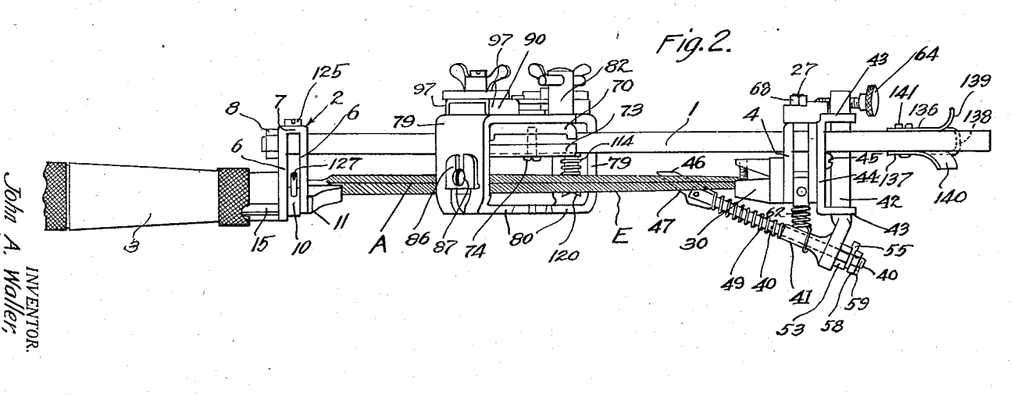
Fig. 2 is a side elevation thereof.
Figure 3:
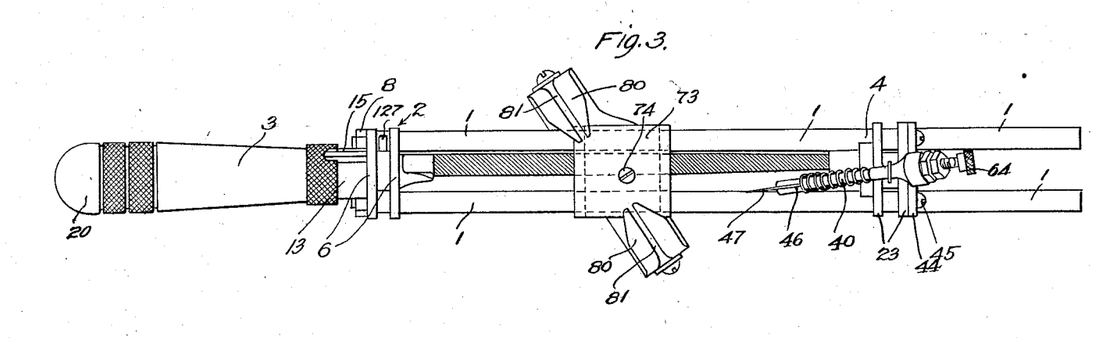
Fig. 3 is an inverted plan view.

Additional handle means 135 may advantageously be provided at the outer ends of rods 1, said handle means being formed for example of a strip of metal bent in U-shape as shown in Fig. 2, and having a portion 136 adapted to rest on top said rods and a lower portion 137 adapted to engage beneath said rods, while the strap or web 138 connecting said portions is sufficiently narrow to pass between said rods. The outer portions of the upper plate 136 adjacent the connecting web 138 may be bent upwardly as indicated at 139 and the corresponding portions of the lower plate 137 may be bent downwardly and outwardly as shown at 140, to facilitate grasping of said handle means in one hand. A screw 141 may extend through the upper plate 136 and threadedly engage the lower plate 137 for the purpose of clamping said handle means in any desired position longitudinally of the rods 1.

The above described saw filing device may be used as follows: The lateral spacing of the tooth-engaging members 111 from the file is first adjusted if necessary, depending upon the spacing of the teeth thereof. In most saws the teeth are spaced so many to the inch and in any such case the spacing discs 101 may be placed with any portion of the circular periphery thereof in contact with pins 105. If, on the other hand, the teeth are not spaced exactly so many to the inch, then the discs may be turned to bring the proper scale mark 106 on the flattened face portion 104 in line with the mark 105. If the discs are moved inwardly against pins 105 in this new position and clamped in such position by means of nuts 102, the tooth-engaging members 111 will then rest evenly in the spaces between teeth of the saw and the file will rest evenly in a tooth midway between said members.

The file is then rotated to the desired vertical angular position, about its longitudinal axis, as above described, so as to bring the faces B and C thereof to the proper inclination of the teeth of the saw. The lifting means consisting of rod 40 and tooth-engaging member or spur 46 are also adjusted so as to lie in advance of the file in the direction in which the file is to progress along the saw in the filing operation, and stop screw 64 may be adjusted so that the spacing of prong 46 from the file is substantially equal to the distance between successive similarly disposed teeth of the saw. In the case of a cross-cut saw, such as that shown, this distance is the length of two teeth, but in a rip-saw it may be the length of only one tooth.

The saw engaging yoke 76 is then adjusted about pivot 77 so as to adjust the file to the horizontal angular position of the faces of the teeth to be filed with respect to the plane of the saw, and is clamped in this position by means of clamping screw 82.

Figure 1:
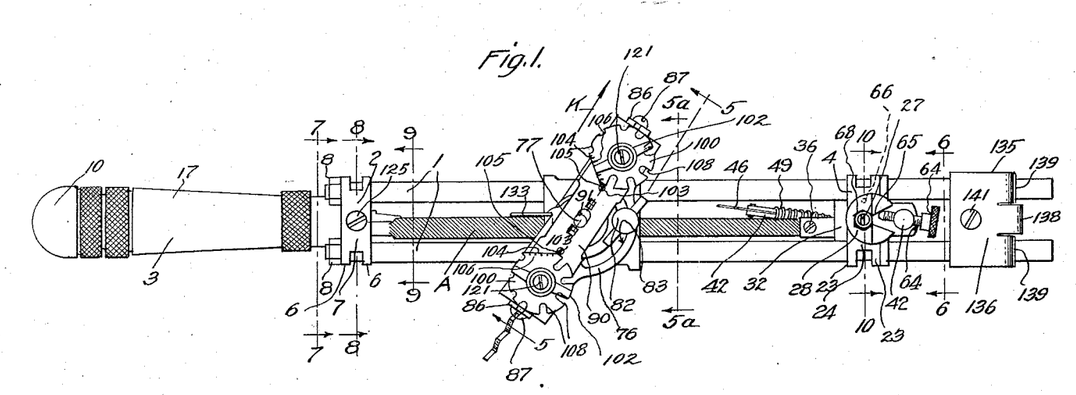
Fig. 1 is a plan view of the device.

The device is then ready for operation, and the respective arms 79 are lowered in position to embrace the blade of the saw at one end thereof, so as to bring the tooth-engaging members 111 and the file into position of engagement with the teeth of the saw. The stop members 86 may be adjusted to the proper height in slots 81, so as to permit the file to normally file the teeth down to only a certain depth below the points of the teeth, except when forcibly depressed against the resilient plate 73 as hereinafter described. The operator may then grasp the handle means 3 in one hand and the handle means 135 at the other end of the device in the other hand and cause the file to be moved back and forth in a sufficient number of times to give the desired filing action. During this filing operation it will be understood that the supporting yoke 76 and guiding plate 70 remain in fixed position with respect to the saw and the file-carrying frame including rods 1, head 2, and clamping means 4, are given a reciprocating motion with respect thereto. When one tooth has been sufficiently filed, which may be at the end of one or more strokes, the file carrying frame is drawn back a greater distance at the end of the back stroke to bring the prong 46 of the lifting means into engagement with the next similarly directed tooth of the saw. In this movement the shoulder 48 on said prong is brought into engagement with the face of the saw blade and the lifting rod 40 is forced inwardly in guide sleeve 41 and against the action of spring 49, at the same time causing the file-carrying frame to be lifted sufficiently to raise the file clear of the saw teeth. It will be understood that in the filing operation a certain lateral pressure is exerted in order to hold the file up against the tooth being filed, and this same lateral pressure serves to shift or advance the file in the direction indicated by the arrow at K in Figs. 1 and 5, as soon as it is raised clear of the teeth, and bring the file up against the prong 46, so that at the commencement of the next forward stroke the guide sleeve 41 recedes along the rod and causes the file to be again lowered in its new position. The prong is then withdrawn from the tooth upon continuation of this forward stroke and the filing operation proceeds as before.

In order to insure the most accurate filing of the saw teeth it is desirable that the tooth-engaging members 111 should be set an even number of teeth away from the lower edge of the file, so that said tooth-engaging members engage in teeth disposed in the same angular direction as the tooth being filed. With saws having an even number of teeth to the inch, or approximately an inch, this relationship exists when the spacing discs 101 are adjusted as above described, with a portion of the peripheral surface or the flattened portion 104 thereof in engagement with pins 103. In some saws, however, such as that illustrated in Fig. 5, there are an odd number of teeth to the inch, so that when said spacing discs are adjusted in this manner the tooth-engaging members engage in teeth which are disposed in the opposing angular direction from the tooth being filed. In such cases, therefore, in order to space the tooth engaging member an even number of teeth from the file. the spacing discs 101 may be turned to position to bring into alignment with the respective pins 103 one of the notches or recesses 108 whose depth is equal to the length of one tooth. The spacing discs may then be slid inwardly toward the center of yoke 76 until the inner ends of said notches come into engagement with said pins. The tooth-engaging member 111 will then be in position for engagement with teeth similar to that engaged by the file.

Figures 5, 5A, 6:
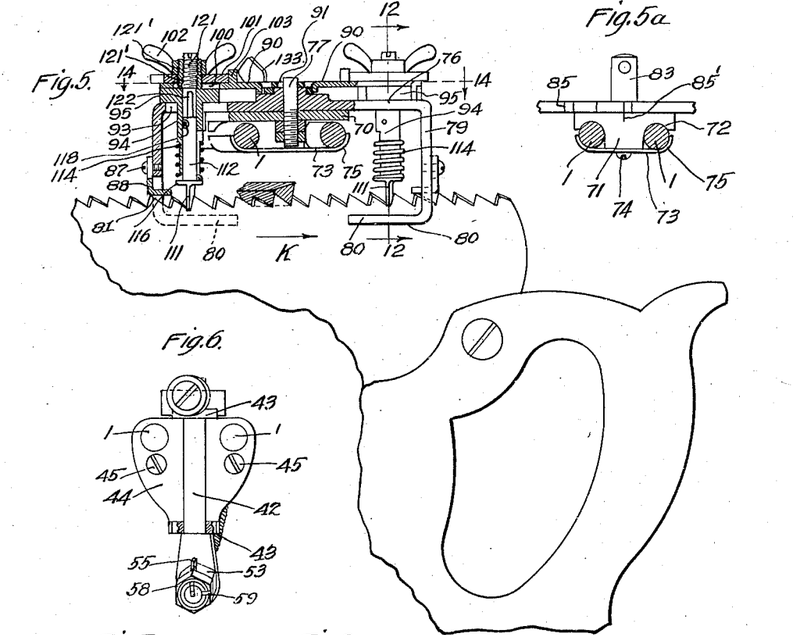
Fig. 5 is a section on line 5—5 in Fig. 1.
Figs. 6 to 11 inclusive are transverse sections on lines 6—6 to 11—11 in Fig. 1.

When the above relationship between the tooth-engaging members and the file is maintained it is evident that the tooth-engaging member which is following the file in the movement thereof longitudinally of the saw, that is, the tooth-engaging member to the left of the file in Fig. 5 is always in engagement with a tooth which has already been filed, and as said tooth-engaging member is prevented from outward yielding in sleeve 113, it will be impossible for the file to be moved laterally more than a certain distance from this tooth-engaging member by the lateral pressure on the filing device, which if permitted would tend to cause excessive filing of some of the teeth. By this means I positively insure that each tooth can only be filed to an amount such as to space the same exactly the desired distance from the tooth in which said tooth-engaging member is engaged.

It may also be seen, however, that the tooth-engaging member which is in advance of the file, namely, to the right thereof in Fig. 5, will always rest in a tooth which has not yet been filed, so that the distance between said tooth and the position of the tooth being filed may be somewhat less than the desired distance between said teeth. It is for this purpose that the spring engaging members are mounted so as to permit inward yielding thereof in the sleeves 113, it being evident that under the conditions just mentioned the tooth-engaging member to the right of the file in Fig. 5 can yield inwardly, the shank portion 112 passing through opening 123, sufficiently to compensate for this improper spacing of the teeth.

A further feature of the invention is that the resilient plate 73 normally holds the frame rods 1 up against the faces of guiding recesses 72 so as to cause both of said rods to move in the same plane parallel to the edge of the saw and prevent tipping of the file, but permits either or both of said guide rods to be depressed somewhat by downward pressure on the frame, so as to permit the file to be tipped slightly or moved down further against the saw teeth, for the purpose of overcoming irregularities in the teeth, as when filing a saw whose teeth are in very bad shape due to previous improper filing.

I claim:

1. A saw filing device comprising supporting means adapted to be mounted in position adjacent the toothed edge of a vertical saw blade and provided with tooth-engaging members, a file carrying frame mounted to slide horizontally on said supporting means and having means for clamping the opposite ends of a file, handle means at one end of said frame, a swivel member mounted on said frame to swing about a vertical axis, and lifting means mounted on said swivel member adapted to engage between teeth of the saw and lift the frame with respect to the saw blade during a portion of the sliding stroke of said frame on said supporting means.

2. A saw filing device comprising supporting means adapted to be mounted in position adjacent the toothed edge of a vertical saw blade and provided with tooth-engaging members, a file carrying frame mounted to slide horizontally on said supporting means and having means for clamping the opposite ends of a file in position of engagement with the teeth of said saw, a swivel member mounted on said frame adjacent one end of the file to swing about a vertical axis, a lifting member mounted on said swivel member below the position of the file so as to slide backward and forward in a direction extending upwardly toward the other end of the file, a tooth-engaging prong at the upper end of said lifting member, means tending to hold said lifting member upwardly with the bottom edge of said prong substantially at the height of the lower edge of the file, while permitting said lifting member to slide downwardly relative to said swivel member upon engagement of said prong with a tooth of the saw, so as to cause said frame to be raised to lift the file from the saw teeth during a portion of the sliding movement of said frame on said supporting means.

3. A saw filing device as set forth in claim 2 and comprising in addition, means tending to hold the upper end of said lifting member out away from the file, while permitting said lifting member to swing inwardly against the file about the axis of said swivel member.

4. A saw filing device as set forth in claim 2 and comprising in addition, means tending to hold the upper end of said lifting member out away from the file, while permitting said lifting member to swing inwardly against the file about the axis of said swivel member, and adjustable stop means for limiting the outward movement of said lifting member.

5. A saw filing device comprising a file-carrying frame, means for supporting said frame above the toothed edge of a saw so as to permit said frame to slide back and forth across the saw, means on said frame for holding the respective ends of a file, means for angularly adjusting said file-holding means and the file about an axis extending longitudinally of the file so as to tip the file in either direction from an intermediate position, a lifting member mounted on said frame adjacent one end of the file so as to swing about a vertical axis to a position at either side of the file, said lifting member being inclined upwardly toward the other end of the file and having a tooth-engaging member at its upper end, and means tending to resiliently hold said tooth-engaging member out away from the file at either side thereof.

6. A saw filing device as set forth in claim 5, said means tending to hold said tooth-engaging member out away from the file comprising resilient means connecting said lifting member to the file holding means for that end of the file, whereby adjustment of the file to one side or the other from said intermediate position causes said lifting member to be shifted to the corresponding side of the file.

7. A saw filing device as set forth in claim 5, said lifting member being mounted to slide downwardly longitudinally of itself and having means tending to hold it up in position with said tooth-engaging member alongside the file, and the downward movement of said lifting member being sufficient to permit said lifting member and tooth-engaging member to be swung beneath the file from one side of the file to the other side.

8. A saw filing device comprising a file-carrying frame, means for supporting said frame above the tooth edge of a saw so as to permit said frame to slide back and forth across the saw, said supporting means comprising a yoke adapted to embrace the blade of the saw and standards mounted on said yoke and provided at their lower ends with tooth-engaging members, said tooth-engaging members being mounted on said standards so as to permit the same to yield inwardly toward one another but to prevent outward yielding thereof, and means on said file-carrying frame for holding a file in position between said tooth-engaging members.

9. In a saw filing device a supporting yoke adapted to embrace the blade of a saw, a file carrying frame mounted thereon and having means for holding a file in position to engage the teeth of the saw, a standard mounted upon said supporting yoke and depending therefrom in a position spaced from the file longitudinally of the saw, and a tooth-engaging member mounted upon said standard so as to yield inwardly toward the position of the file while being held against outward movement away from the file.

10. In a saw filing device a supporting yoke adapted to embrace the blade of a saw, a file-carrying frame slidably mounted on said supporting means and having means for holding a file in position to engage the teeth of the saw, a bridge member mounted on said supporting yoke so as to move thereon in a direction longitudinally of the saw blade, two standards mounted upon said bridge member at the respective sides of the file and provided with tooth-engaging members at their lower ends, and means for moving said bridge member together with said standards and tooth-engaging members in either direction on said supporting yoke so as to compensate for the thickness of said tooth-engaging members and maintain the desired spacing between the file and the inner face of one or the other of said tooth-engaging members.

11. In a saw filing device a supporting yoke adapted to engage the toothed edge of a saw blade, a guide plate mounted on said supporting means, a file-carrying frame comprising two parallel guide rods and means at the ends thereof for holding the ends of a file, said guide plate being provided with guiding recesses fitting the upper faces of said guide rods, and a resilient plate secured to said guide plate and extending beneath and in engagement with the lower faces of said guide rods.

12. A saw filing device comprising supporting means having members adapted to embrace a saw blade, a file carrying frame pivotally and slidably mounted on the central portion of said supporting means and having means for holding a file in position for engagement with the teeth of the saw, two standards mounted on said supporting means at opposite sides of the file carrying frame and each provided with tooth engaging means at its lower end, said standards being adjustable toward and away from said file carrying frame, positioning members adapted to be turned to different angular positions about the respective standards and having portions of their peripheries spaced at different distances from their centers of rotation, two projecting members on said supporting means in position to engage the peripheries of the respective positioning members to limit inward adjustment of said standards, and means for clamping said standards in any position to which they may be so adjusted.

13. A saw filing device as set forth in claim 12, each of said positioning members comprising a disc having a portion of its periphery flattened so that different parts of said flattened portion are at different distances from the center of rotation thereof whereby turning of said discs so as to bring different parts of said flattened portions into position to engage said projecting members permits the respective standards to be adjusted inwardly to different distances from the position of the file, and said device also comprising means on said discs for indicating the distance to which said standards may be so adjusted for positions of engagement of different parts of said flattened portions with said projecting members.

14. A saw filing device comprising supporting means adapted to be mounted in position adjacent the toothed edge of a vertical saw blade and provided with tooth engaging members, a file carrying frame mounted to slide horizontally on said supporting means and having means for clamping the opposite ends of a file, handle means secured to said frame, and lifting means mounted on said frame and adapted to engage the teeth of the saw and lift the frame with respect to the saw blade during a portion of the sliding stroke of said frame on said supporting means.

15. A saw filing device as set forth in claim 14, said lifting means being mounted at the side of the file so as to permit movement thereof toward or away from the file, and said device also comprising means tending to hold said lifting means out away from the file.

16. A saw filing device as set forth in claim 14, said lifting means being mounted at the side of the file so as to permit movement toward or away from the file and said device also comprising adjustable stop means limiting the outward movement of said lifting means and means resiliently holding said lifting means out against said stop means while permitting inward movement thereof toward the file.

17. A saw filing device as set forth in claim 14, said lifting means being adjustable to position at either side of the file.

18. In a saw filing apparatus, frame means, file supports pivotally mounted on said frame means and adapted to hold a file, supporting means adapted to be mounted in position adjacent the toothed edge of a saw and provided with slide bearing means for slidably mounting said frame means thereon, and lifting means carried by the frame means and adapted to engage the teeth of the saw to lift the file off the saw during a part of the sliding movement of the frame means on said supporting means.

19. A construction as set forth in claim 18 and comprising in addition means pivotally supporting said lifting means on the frame means to enable it to swing to either side of the file and also comprising, in addition, means for pivotally connecting the said supporting means to the frame means so as to provide for angular adjustment of said frame means with relation to said supporting means.

20. A construction as set forth in claim 18 and comprising, in addition, means for pivotally mounting said lifting means on the frame to enable it to swing to either side of the file, and means resiliently resisting swinging of said lifting means and tending to hold the same out away from the file.

In testimony whereof I have hereunto subscribed my name this 27th day of August, 1928.

JOHN A. WALLER.